United States Patent [19]

Koelfgen

[11] Patent Number: 5,548,893
[45] Date of Patent: Aug. 27, 1996

[54] SPIN-ON OIL FILTER REPLACEMENT ELEMENT

[76] Inventor: Douglas F. Koelfgen, 21595 County Rd. 83, Big Lake, Minn. 55309

[21] Appl. No.: 407,208

[22] Filed: Mar. 20, 1995

[51] Int. Cl.⁶ .................................................. B01D 35/02
[52] U.S. Cl. .................. 29/888.011; 29/525.02; 29/525.11; 210/130; 210/136; 210/232; 210/444; 210/454; 210/455
[58] Field of Search .................................. 210/130, 168, 210/232, 238, 438, 440, 443, 444, 454, DIG. 17, 136, 450, 455; 184/6.24; 123/196 A; 29/888.011, 525.02, 525.11

[56] References Cited

U.S. PATENT DOCUMENTS

| | | | |
|---|---|---|---|
| 3,333,703 | 8/1967 | Scavuzzo et al. | 210/232 |
| 5,066,381 | 11/1991 | Faria | 210/85 |
| 5,089,129 | 2/1992 | Brigman | 210/223 |
| 5,114,572 | 5/1992 | Hunter et al. | 210/232 |
| 5,342,519 | 8/1994 | Friedmann et al. | 210/232 |
| 5,374,355 | 12/1994 | Habiger et al. | 210/440 |

FOREIGN PATENT DOCUMENTS

| | | | |
|---|---|---|---|
| 1532437 | 7/1968 | France | 210/DIG. 17 |
| 3820675 | 12/1989 | Germany | 123/196 A |
| 3933794 | 4/1991 | Germany . | |
| 4022723 | 4/1991 | Germany . | |

*Primary Examiner*—Matthew O. Savage
*Attorney, Agent, or Firm*—Kinney & Lange, P.A.

[57] ABSTRACT

A modular oil filter is used in an engine with a spin-on type oil inlet port. An adapter is screwed onto the inlet port, and secured thereon by a lock nut. A backflow valve may optionally be secured between the lock nut and the adapter to cover the oil entrance(s) in the adapter. A replaceable oil filter element is coaxially located against a seal shoulder of the lock nut. A housing or canister surrounds the filtration element and releasably secures to the adapter. The filter element may have outwardly extending tabs, an inner or outer diameter releasably connected to a spring coil, or other means to releasably secure the filter element within the canister prior to being placed on the adapter/lock nut.

16 Claims, 5 Drawing Sheets

SPIN-ON OIL FILTER REPLACEMENT ELEMENT

BACKGROUND OF THE INVENTION

This invention pertains to oil filters for filtering engine oil, and more particularly to replaceable oil filters which spin-on to a threaded oil inlet port in an engine. These spin-on oil filters are commonly used in internal combustion engines for vehicles such as motorcycles and cars.

Filtration of engine oil is very important for maintenance and upkeep of many engines, and particularly for motor vehicle engines. Dirt, metal particles and other contaminants are picked up by the oil in lubricating the engine. Removal of these particles from the engine oil is required to prevent excessive engine wear and increase engine life. The engine oil is generally pumped through a replaceable filter to clean the oil during engine operation. In many engines, the oil filter spins onto a threaded oil inlet port (i.e., the port where oil exits the filter and re-enters the engine) having an outer diameter of approximately ½ to ¾ inches. A flat seal surface is provided on the engine, typically 3–4 inches in diameter, coaxially surrounding the inlet port. An oil outlet port (i.e., the port where oil exits the engine and enters the filter) is provided in the engine between the threaded inlet port and the seal surface. The filter screws onto the inlet port and, when fully seated, makes a seal against the exterior seal surface. During operation of the engine, oil flows into the filter through the outlet port, travels through the filtration material, and then exits the filter through the central threaded inlet port.

Engine oil filters should be regularly replaced before they become clogged or otherwise do not provide effective oil filtration. For many vehicles, oil filter replacement is recommended every 3,000 to 5,000 miles. Since the life of the vehicle may be 100,000 to 200,000 miles, a properly maintained vehicle will use 30–70 replaceable oil filters during its life.

Oil filters when removed from an engine contain a substantial amount of dirty engine oil, which is unwanted in the environment, and may further contain unnatural metal and/or plastic compositions which may take centuries to properly decompose. With current and upcoming anti-pollution legislation, the disposal of this large number of used oil filters is becoming more and more of a problem. Accordingly, it is desired to provide better ways to minimize the waste produced by used motor vehicle engine oil filters.

Several modular filter systems have been designed for use with the spin-on type oil filter station. For example, U.S. Pat. No. 5,066,391 to Faria discloses an oil filter having a filter element which is separate from an exterior canister. This allows for changing of the filter element without disposal of the canister. However, manufacture of previous modular oil filters is labor intensive and may require excessive machining and manufacturing time. Replacement of previous oil filter elements can be cumbersome and messy, particularly given the size constraints of the engine around the oil filtration station. Accordingly, a new design of oil filter is needed which will reduce oil filter waste, but still allow for simple removal and replacement of the filter element.

SUMMARY OF THE INVENTION

The present invention is a modular oil filter for use with a spin-on type inlet port. An adapter is screwed onto the inlet port, and is held on securely by a lock nut. A backflow valve may optionally be secured between the lock nut and the adapter to cover the oil entrance(s) in the adapter. A replaceable oil filter element is coaxially located against a seal shoulder of the lock nut. The filter element is tubular and defines a clean oil chamber. A housing or canister surrounds the filter element defining a dirty oil chamber, and releasably secures to the adapter. The filter element may have outwardly extending tabs, an inner or outer diameter releasably connected to a spring coil, or other means to releasably secure the filter element within the canister when placed on the adapter/lock nut. Oil flows past the backflow valve into the dirty oil chamber, through the filtration material in the filter element into the clean oil chamber, and through central hole in the lock nut and adapter back into the engine.

During replacement of the oil filter element, the canister may simply be removed from the adapter with the filter element attached in the canister. The backflow valve prevents oil from leaking out of the engine. A new filter element may simple be exchanged for the used filter element in the canister, and the canister reattached to the adapter.

While the above-identified drawing figures set forth alternative embodiments, other embodiments of the present invention are also contemplated, some of which are noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
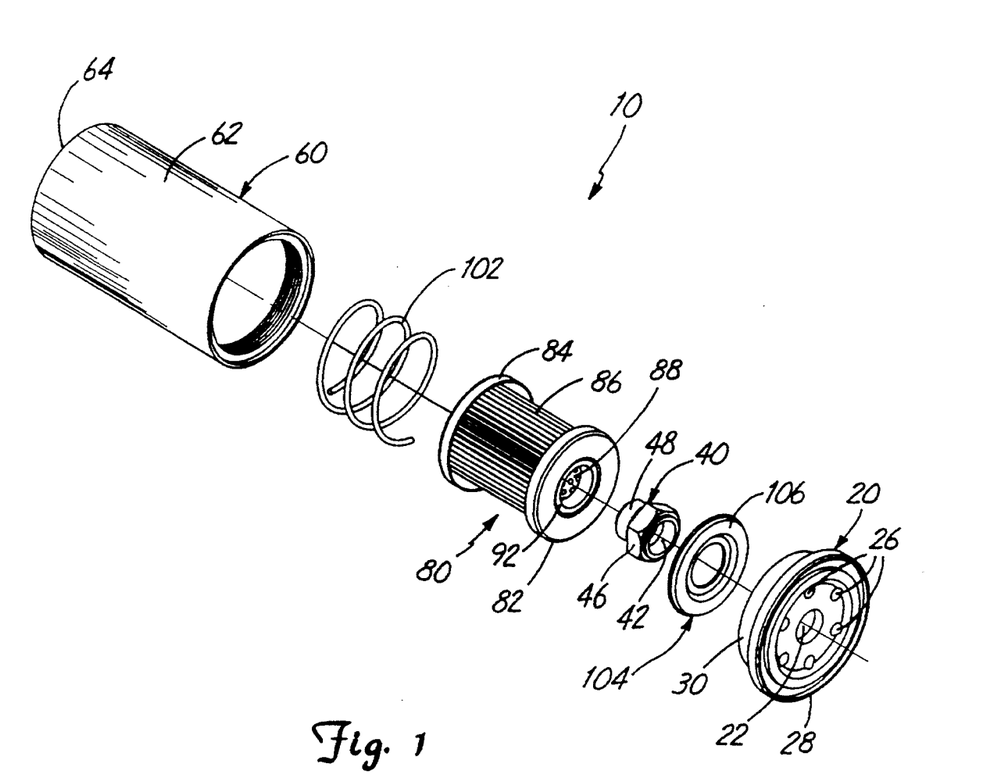
FIG. 1 is an exploded view of the oil filter kit of this invention.
Figure 2:
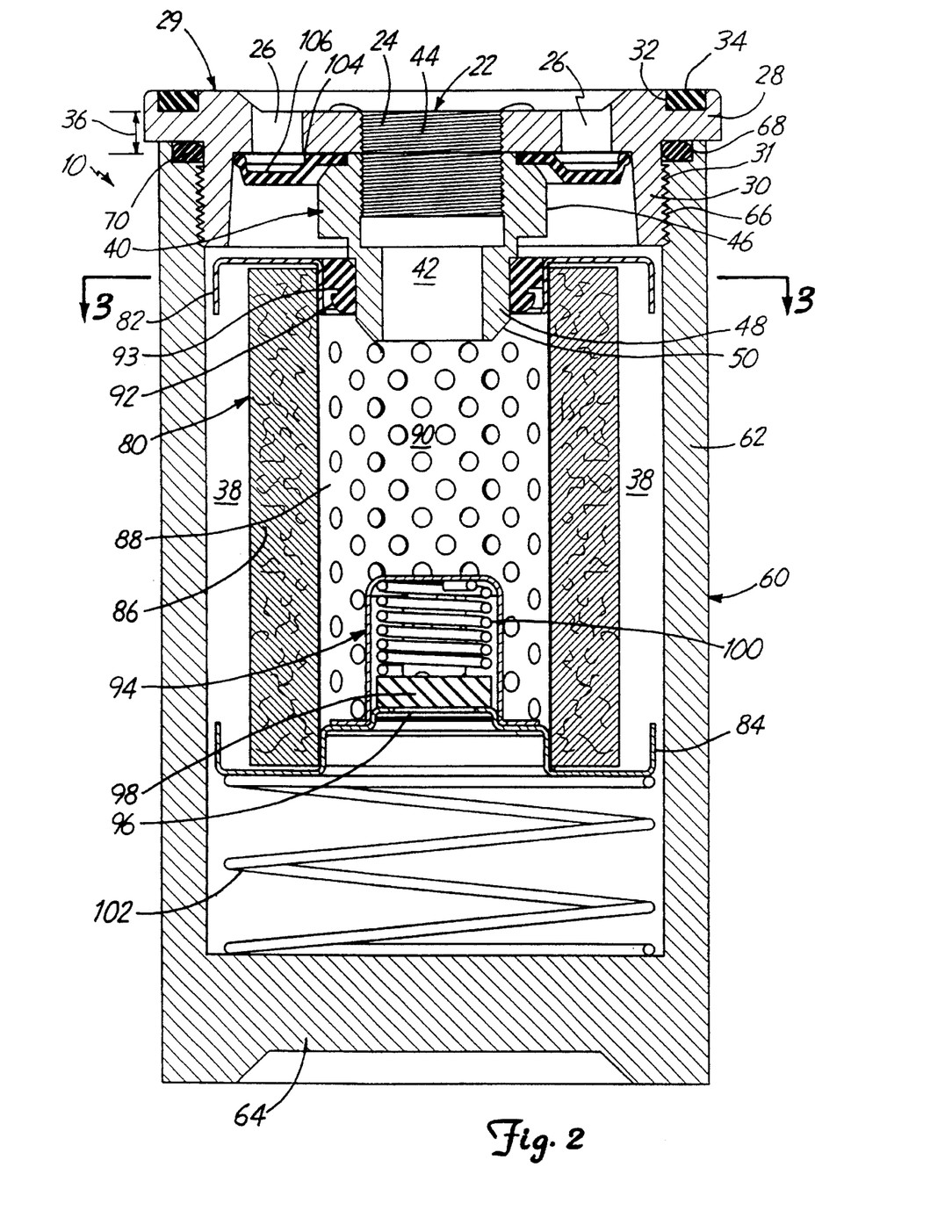
FIG. 2 is a cross-sectional view of the oil filter of this invention as assembled.

With reference to FIGS. 1 and 2, the present invention is shown as oil filter kit 10 with four primary components. Oil filter 10 includes adapter 20, lock nut 40, canister 60 and filter element 80. Adapter 20 includes central oil exit hole 22 with threads 24 sized to mate with the threads of an oil inlet port of an engine. Adapter 20 includes one or more oil entrance holes 26 disposed around exit hole 22, as well as circumferential sealing flange 28 and canister connection flange 30. When attached to a screw-on type oil inlet port of an engine (not shown), sealing flange 28 has recess 32 opposite the flat seal surface of the engine. A gasket, O-ring or other sealing device 34 may be disposed within recess 32 for proper sealing against the seal surface of the engine. The outer surface of sealing flange 28 may be circular as shown, or may have a 14-sided hexagonal head to allow for tightening by either a 14 sided wrench commonly found in many garage shops.

While six oil entrance holes 26 are shown, any number of oil entrance holes 26 can be used. The configuration of entrance holes 26 is chosen based on the configuration of the engine, such that oil entrance holes 26 permit flow of oil through adapter 20 into dirty oil chamber 38. For instance, a single oil entrance hole 26 to one side may be all that is needed. Additionally, oil entrance holes 26 may be larger or smaller than shown. The size of oil exit hole 22, oil entrance holes 26, sealing flange 28 and o-ring 34 are generally dependent upon the make and configuration of the engine, and the present invention contemplates use with numerous different engines and numerous sizes of filters.

As best seen in FIG. 2, internal threads 24 on adapter 20 extend all the way through adapter 20. Additionally, adapter 20 has a relatively small width 36 at exit hole 22. Adapter 20 must be able to spin completely onto the threads of the oil inlet port of the engine, and continue to spin-on to the oil inlet port to leave a significant amount of threads extending through the adapter 20.

After adapter 20 is screwed in place on the engine, it is secured by lock nut 40. Lock nut 40 has central opening 42 with threads 44 extending a portion of the way through central opening 42. A hexagonal head 46 is provided around the threads 44. Hexagonal head 46 allows for easy turning and tightening of lock nut 40 with a hexagonal wrench, onto the engine inlet port threads.

Lock nut 40 further has seal shoulder 48 projecting away from threads 44. Seal shoulder 48 preferably has a circular profile, and portion 50 of seal shoulder 48 is slanted or conical. The circular profile allows a seal against seal shoulder 48 regardless of slight differences in the axial location of filter element 80 relative to lock nut 40. Slanted or conical portion 50 helps to center and seat filter element 80 during assembly. Workers skilled in the art will appreciate that other configuration of seal shoulder 48 can be used, but the seal shoulder 48 shown provides a good seal which is easily reproduced despite slight manufacturing and assembly errors.

Canister 60 forms the outer enclosure of oil filter kit 10, and includes peripheral wall 62 and end wall 64. Canister 60 releasably attaches to adapter 20 at canister connection flange 30. While canister 60 can be formed in any shape desired, the preferred shape for canister 60 is cylindrical. The preferred method of releasable connection is through mating of exterior threads 31 on canister connection flange 30 with interior threads 66 on peripheral wall 62. Canister 60 can seal against adapter 20 in any way known in the art, however, it is preferred to retain O-ring 68 in recess 70 to assure sealing between peripheral wall 62 and adapter 20 when canister 60 is fully seated (screwed) onto adapter 20, as shown in FIG. 2. With a cylindrical shape and mated threads 31, 66, canister 60 may be attached to adapter 20 simply by hand turning.

Adapter 20, lock nut 40 and canister 60 may be made out of a number of different materials provided that they withstand the heat and pressure of the engine oil. For low cost strength, high durability and ease of manufacturing, adapter 20, lock nut 40 and canister 60 are preferably machined out of stainless steel and/or aluminum.

As shown in FIG. 2, cartridge or filter element 80 includes first end cap 82, second end cap 84, and filtration material 86 disposed in between end caps 82, 84. Filtration material 86 may be paper or some other permeable substance which will collect dirt particles when oil passes through it. The outer diameter of filter element 80 is smaller than the inner diameter of canister 60, defining dirty oil chamber 38 therebetween. The filtration material 86 may be disposed around perforated cylinder 88, defining a central clean oil chamber 90 within filter element 80. Performed cylinder 88 is preferably made of metal and keeps filtration material 86 from collapsing due to the oil flow and pressure differential through filtration material 86. End caps 82, 84 may be made of metal and help to provide structural rigidity of filter element 80. Alternatively, either end caps 82, 84 or perforated cylinder 88 may be made of paper or cardboard. Making end caps 82, 84 and perforated cylinder 88 out of paper or cardboard may make manufacture less costly and allow for easier disposal of filter element 80. End cap 82 further helps to prevent oil flow from dirty oil chamber 38 into clean oil chamber 90 without passing through filtration material 86.

Seal 92 is an annular seal housed on the inside shoulder 93 of end cap 82. Seal 92 is made out of a compressible impermeable material such as rubber, and forms a tight seal between end cap 82 and seal shoulder 48 of lock nut 40. This tight seal further prevents oil flow directly into clean oil chamber 90 unless it first passes through filtration material 86.

As shown in FIG. 2, the second end cap 84 includes pressure relief valve 94. Valve 94 includes a central opening 96 which is closed by stop 98. Stop 98 is held against opening 96 by spring 100. If the oil pressure differential between the dirty oil chamber 38 and the clean oil chamber 90 becomes excessive (such as when filtration material 86 becomes clogged), pressure relief valve 94 will open to prevent excessive pressure build up. Obviously, if oil is passing through pressure relief valve 94, no oil filtration is occurring and filter element 80 needs to be replaced.

To assure that filter element 80 is properly seated onto lock nut 40, spring 102 is used. Spring 102 biases between end wall 64 of canister 60 and end cap 84 of filter element 80. Spring 102 thus places a positive force pressing filter element 80 onto lock nut 40 to maintain seal 92 against seal shoulder 48. Workers skilled in the art will appreciate the spring 102 is not necessary to maintain a seal, and other configurations could also seat filter element 80 onto lock nut 40. However, spring 102 provides a relatively constant force against filter element 80 and provides a good seal between filter element 80 and lock nut 40 regardless of slight placement differences of adapter 20 and lock nut 40 on the engine, and filter element 80 against lock nut 40. Spring 102 also allows for longer and short filter elements 80, as may be specified by the engine manufacturer or filter manufacturer or user preference.

A backflow valve 104 is optionally secured between lock nut 40 and adapter 20. The periphery 106 of backflow valve 104 extends to cover oil entrance holes 26. Backflow valve 104 is preferably formed out of a pressure deformable material such as rubber or another elastomer. When there is no pressure differential through the oil entrance holes 26, backflow valve 104 covers oil entrance holes 26 (as shown in FIG. 2) and prevents oil from running out of the engine. This would occur for instance during replacement of filter element 80 when canister 60 is removed. However, with the positive oil pressure differential caused by the oil pump of the engine during engine running, the oil pressure differential bends periphery 106 backward and opens valve 104. Thus, during normal engine operation, oil flows freely into dirty oil chamber 38. For engines having the oil filter on the pressure side of the lubrication system, backflow valve 104 may further prevent oil from exiting dirty oil chamber 38 while the engine is turned off, and therefore help to provide immediate oil pressure when the engine is started again. Workers skilled in the art will appreciate that other configurations of backflow valves can effectively be used to prevent oil from flowing out of oil entrance holes 26 during filter element 80 replacement.

Often, there is limited space for removal of canister 60 from the screw-on oil inlet port on the engine. The limited space often does not permit axial movement of canister 60 for the 3–4 inches necessary to pass over a filter element 80 which is retained on seal shoulder 48. Accordingly, several embodiments have been included herein which effectively retain filter element 80 in canister 60 during removal from the engine.

Figure 3:
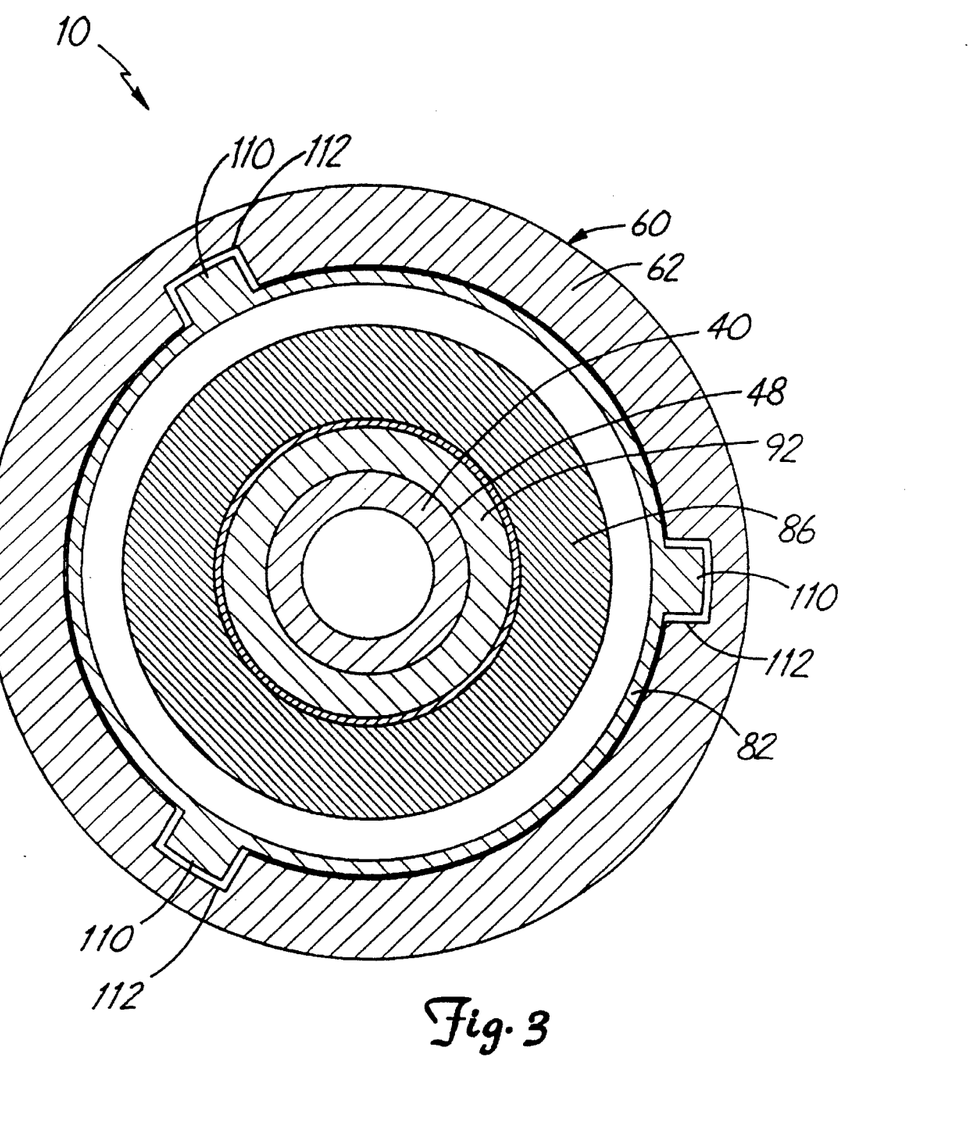
FIG. 3 is a cross-sectional view of a first alternative embodiment of the oil filter, taken along line 3—3 in FIG. 2.

FIG. 3 shows a cross-sectional view of a first alternative embodiment of oil filter 10, taken along line 3—3 in FIG. 2. As shown, end cap 82 of filter element 80 includes tabs 110 which project outward. Recesses 112 are disposed within the peripheral wall 62 of canister 60 and extend axially. During installation of oil filter 10, filter element 80 is placed such that tabs 110 line up with recesses 112, and then simply dropped into canister 60. Tabs 110 and recesses 112 retain filter element 80 centrally and coaxially within canister 60. If desired, tabs 110 may have an interference fit with peripheral wall 62 and act as deflection springs to retain filter element 80 within canister 60.

When canister 60 is being unscrewed from adapter 20 during filter element replacement, the interaction between recesses 112 and tabs 110 rotates filter element 80. The rotation of filter element 80 breaks the seal between filter element 80 and seal shoulder 48. Friction between tabs 110 and recesses 112 causes filter element 80 to be pulled off of seal shoulder 48. By the time canister 60 is totally unscrewed from adapter 20, filter element 80 is no longer attached to lock nut 40, and canister 60 can be removed without further axial movement.

If desired, a circular groove may be formed at a selected depth within canister 60 which corresponds with the assembly depth of tabs 110. The circular groove may be 360° in circumference, or may only extend part way around peripheral wall 62 from each of linear recesses 112. The circular groove or partially circular grooves will further retain filter element 80 within canister 60 during removal from the engine. If desired, the grooves may include a notch such that tension between spring 102 and tabs 110 allows filter element to be securely held in place against the notches. This type of mounting of filter element 80 within canister 60 may be referred to as a "bayonet mount" or a "camera lens mount". Workers skilled in the art will appreciate that various other tab/groove configurations can be used to retain filter element 80 in canister 60 when canister 60 is removed from the engine.

Figure 4:
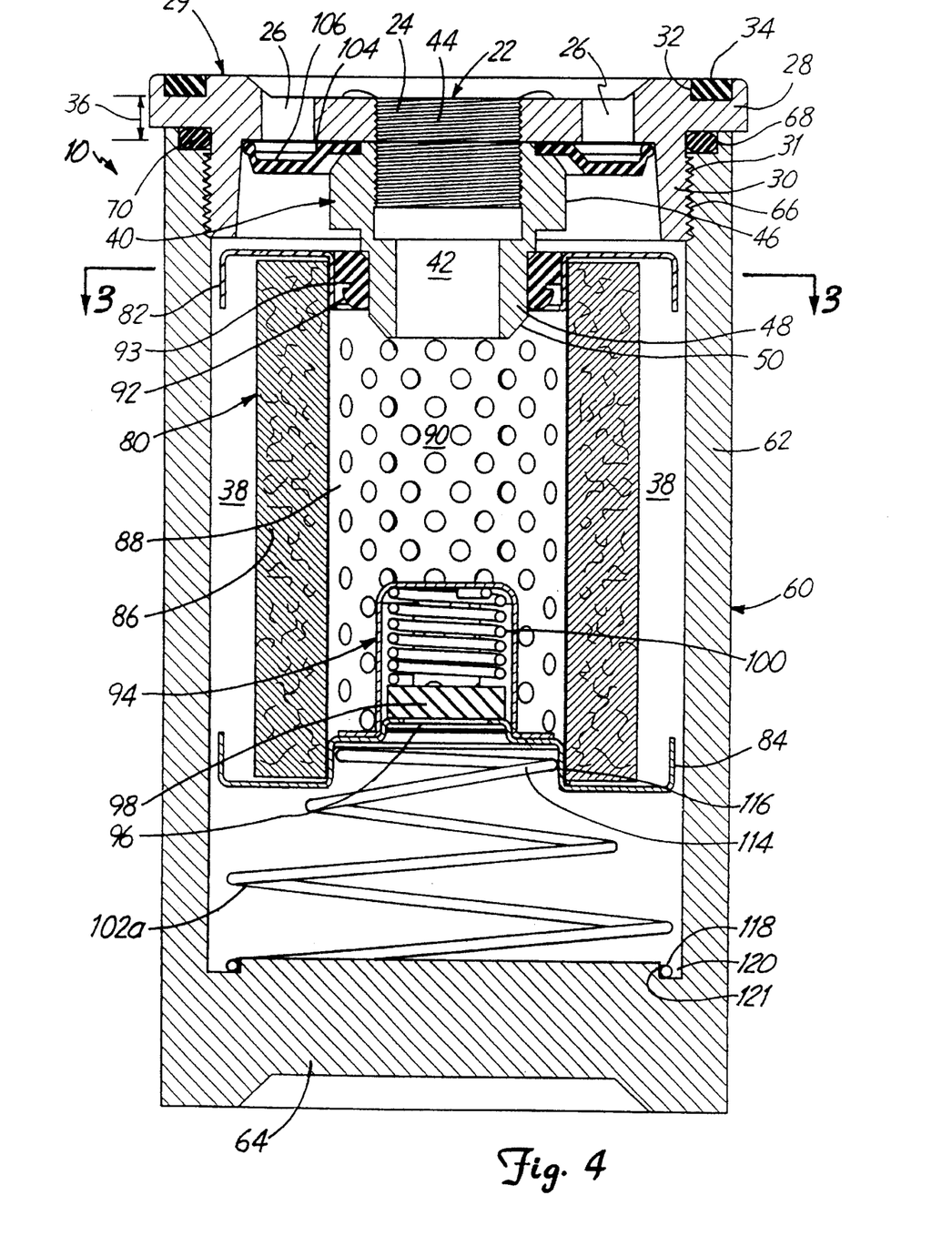
FIG. 4 shows a cross-sectional view of a second alternative embodiment of the oil filter as assembled.

FIG. 4 shows a second alternative configuration to secure filter element 80 within canister 60 for removal from the engine. In this configuration, spring 102a also centers filter element 80 within canister 60 and on seal shoulder 48. As shown, spring 102a has a smaller coil 114 at one end. This coil 114 has an interference fit with the inside lip 116 of second end cap 84. The opposite side of spring 102a has a coil 118 which fits into circular recess 120 around lip 121. When assembled, coil 118 is frictionally retained onto end wall 64, and filter element 80 is frictionally retained onto coil 114. This configuration of spring 102a could be used with or without the tab/groove configuration shown in FIG. 3. Workers skilled in the art will appreciate that various configurations of canisters 60, springs 102a and filter elements 80 can be used to temporarily retain filter element 80 within canister 60 during removal of canister 60 from the engine. For instance, spring 102a could be permanently affixed within canister 60 and removably attached to filter element 80, or permanently attached to filter element 80 and removably attached to canister 60.

Figure 5:
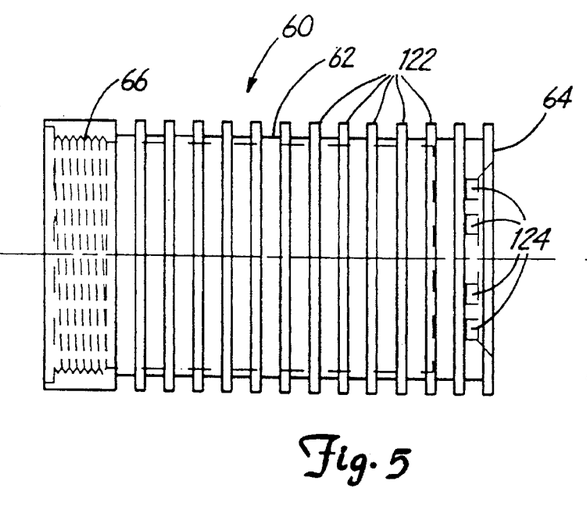
FIG. 5 is a side view of an alternative embodiment of the canister.
Figure 6:
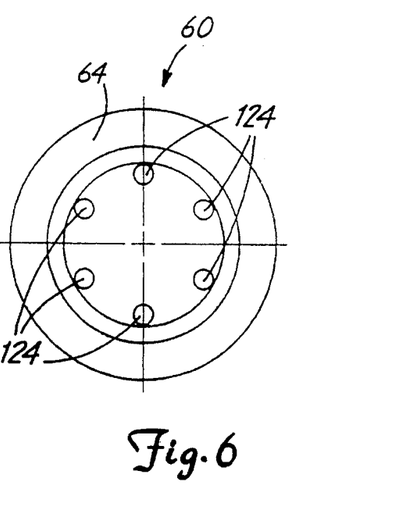
FIG. 6 is an end view of the alternative embodiment of FIG. 5.

FIGS. 5 and 6 shown an alternative embodiment of the exterior of canister 60. As shown in FIG. 5, canister 60 includes fins 122 on its exterior surface. Fins 122 allow for substantial oil cooling during filtration. Six recesses 124 are shown disposed in end wall 64 of canister 60. These recesses 124 allow for attachment of a spanner wrench (not shown) to assist in easy removal of canister 60 from adapter 20.

Figure 7:
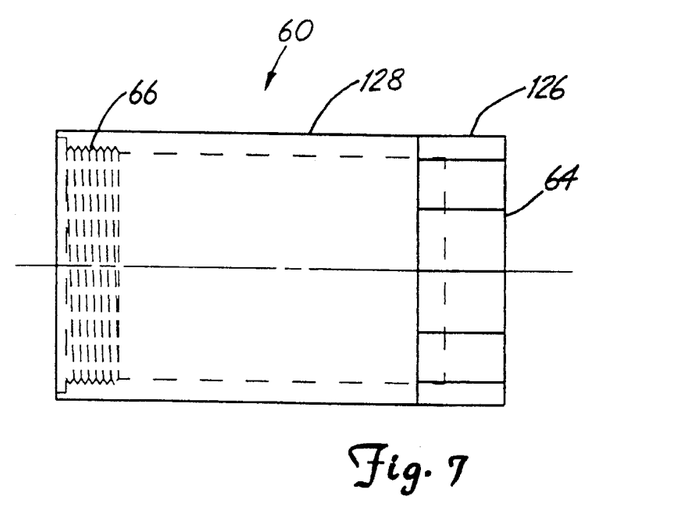
FIG. 7 is a side view of a second alternative embodiment of the canister.

As shown in FIG. 7, canister 60 may have a second alterative exterior configuration similar to that found in most conventional oil filters. As shown, canister 60 includes a 14-sided hexagonal head portion 126 as well as a circular exterior portion 128. This allows for attachment by either a 14 sided wrench or an oil filter wrench commonly found in many garage shops.

Assembly and use of the oil filter 10 is as follows. First, the adapter 20, lock nut 40, filter element 80 and canister 60 are obtained as a kit. Adapter 20 and lock nut 40 are secured to the oil exit port on the engine. If desired, backflow valve 104 is included in the kit and is secured between adapter 20 and lock nut 40. Spring 102 is placed into canister 60 if desired, followed by filter element 80. Canister 60 is then screwed onto adapter 20 as shown in FIG. 2.

When replacement of filter element 80 is required (such as after 3,000 miles of engine life), canister 60 is simply unscrewed from adapter 20 and taken off with oil filter element 80 retained therein. Adapter 20 and lock nut 40 are left secured on the oil inlet port of the engine. During replacement, backflow valve 104 prevents further flow of oil out of the engine. Oil filter element 80 is removed from canister 60 and a new oil filter element 80 is substituted in its place. Oil filter element 80 and canister 60 are then screwed back onto adapter 20 for further use.

As can be seen, the adapter/lock nut configuration of the present invention securely attaches adapter 20 onto the automobile engine for as long as desired. Rotating or removal of canister 60 from adapter 20 does not cause adapter 20 to loosen from the oil inlet threads. Retention of filter element 80 within canister 60 allows the filter element 80 to be removed from lock nut 40 with minimal axial clearance within the engine. Use of backflow valve 104 helps to limit oil spilling, as does retention of filter element 80 within canister 60 during removal. All the parts are relatively easy to manufacture and to assemble, providing for a low cost oil filter 10 which solves numerous problems of prior art devices.

Although the present invention has been described with reference to preferred embodiments, workers skilled in the art will recognize that changes may be made in form and detail without departing from the spirit and scope of the invention.

What is claimed is:

1. A spin-on oil filter kit for use with an engine having an oil inlet port with external threading and an oil outlet port adjacent the oil inlet port, the oil filter kit comprising:

an annular adapter having internal threads extending therethrough and sized to mate with external threading on an oil inlet port of an engine, the adapter having an outer periphery and defining an oil entrance between the outer periphery and the internal threads;

a lock nut for securely retaining the annular adapter on the oil inlet port of the engine, the lock nut having a central opening defining an oil exit hole therethrough, at least a portion of the lock nut having internal threads of the same size as the internal threads of the adapter, the lock nut having a seal shoulder extending opposite the internal threads;

a canister removably attachable to the outer periphery of the adapter, the canister having a peripheral wall and an end wall attached to the peripheral wall; and a filter element sized to fit within the canister and against the seal shoulder of the lock nut, the filter element comprising:

an annular front end cap defining an axis, adapted to seal against the seal shoulder of the lock nut;

a rear end cap opposing the front end cap; and filtration material disposed between the front end cap and the rear end cap and having an elongated annular shape about the axis and defining a clean oil chamber along the axis within the filter element;

the filtration material having an outer periphery smaller than the peripheral wall of the canister so as to define a dirty oil chamber between the filtration material and the peripheral wall of the canister.

2. The oil filter kit of claim 1, further comprising:

a backflow valve held in place by the lock nut, the backflow valve extending from the lock nut peripherally outward to cover the oil entrance on the adapter, the backflow valve being formed of a pressure deformable material and shaped so as to open with a positive oil pressure differential through the oil entrance and so as to close when no positive oil pressure differential through the oil entrance exists.

3. The oil filter kit of claim 1, further comprising:

a spring for placement between the end wall of the canister and the filter element to bias the front end cap of the filter element against the seal shoulder of the lock nut.

4. The oil filter kit of claim 3, wherein the filter element further comprises a lip which releasably secures the filter element to the spring.

5. The oil filter kit of claim 4, wherein the end wall of the canister includes a lip to releasably secure the spring to the end wall of the canister.

6. The oil filter kit of claim 4, wherein the spring is permanently attached to the end wall of the canister.

7. The oil filter kit of claim 1, wherein the filter element further comprises:

at least one tab extending radially outward from one of the front end cap and the rear end cap so as to interfere with at least a portion of the peripheral wall of the canister, the tab removably retaining the filter element within the canister.

8. The oil filter kit of claim 7, wherein the peripheral wall of the canister defines at least one interior groove sized and spaced to receive the tab of the filter element.

9. The oil filter kit of claim 7, wherein the tab is a deflection spring which deflects upon interference with the peripheral wall of the canister.

10. The oil filter kit of claim 1, wherein the outer periphery of the adapter has external threads, and wherein the canister has internal threads which mate with the internal threads of the adapter to removably attach the canister to the adapter.

11. The oil filter kit of claim 10, wherein the end wall of the canister has recesses therein allowing tightening of the canister onto the adapter by turning of a spanner wrench extending into the recesses.

12. The oil filter kit of claim 10, wherein the end wall of the canister has a 14-sided hexagonal head allowing tightening of the canister onto the adapter by turning of a 14-sided hexagonal wrench engaging the 14-sided hexagonal head.

13. The oil filter kit of claim 1, wherein the lock nut has a hexagonal head opposite the seal shoulder for tightening the lock nut on the oil inlet port of the engine.

14. The oil filter kit of claim 1, wherein the rear end cap comprises:

a pressure relief valve which opens to allow flow from the dirty oil chamber through the pressure relief valve into the clean oil chamber when an oil pressure differential between the dirty oil chamber and the clean oil chamber exceeds a set value.

15. A method of attaching an oil filter element to an engine having an oil inlet port with external threading and an oil outlet port adjacent the oil inlet port, the method comprising:

screwing an annular adapter having internal threads extending therethrough onto an inner portion of external threading on the oil inlet port of the engine;

screwing a lock nut onto an outer portion of external threading on the oil inlet port, thereby retaining the annular adapter on the oil inlet port, the lock nut having a seal shoulder extending opposite the annular adapter;

placing an oil filter element within a canister, the oil filter element having an annular front end cap defining an axis, a rear end cap opposing the front end cap, and filtration material attached between the front end cap and the rear end cap and having an elongated annular shape about the axis and defining a clean oil chamber along the axis within the filter element, the canister having a peripheral wall and an end wall attached to the peripheral wall;

removably attaching the canister to an outer periphery of the adapter, thereby sealing the oil filter element against the seal shoulder of the lock nut.

16. The method of claim 15, further comprising:

releasably attaching the oil filter element within the canister, such that removing the canister from the outer periphery of the adapter simultaneous removes the oil filter element from the seal shoulder of the lock nut.

\* \* \* \* \*

UNITED STATES PATENT AND TRADEMARK OFFICE
CERTIFICATE OF CORRECTION

PATENT NO. : 5,548,893
DATED : AUGUST 27, 1996
INVENTOR(S) : DOUGLAS F. KOELFGEN

It is certified that error appears in the above-indentified patent and that said Letters Patent is hereby corrected as shown below:

On the first page [54] in the title, delete "REPLACEMENT", insert --WITH REPLACEABLE--

Col. 4, line 4, delete "Performed", insert --Perforated--

Signed and Sealed this

Seventeenth Day of December, 1996

*Attest:*

BRUCE LEHMAN

*Attesting Officer*  *Commissioner of Patents and Trademarks*